US008477935B2

(12) United States Patent
Langendoerfer et al.

(10) Patent No.: US 8,477,935 B2
(45) Date of Patent: Jul. 2, 2013

(54) METHOD AND APPARATUS FOR CALCULATING A POLYNOMIAL MULTIPLICATION, IN PARTICULAR FOR ELLIPTIC CURVE CRYPTOGRAPHY

(75) Inventors: Peter Langendoerfer, Frankfurt (DE); Zoya Dyka, Teltow (DE); Peter Steffen, Frankfurt (DE)

(73) Assignee: IHP GmbH, Frankfurt (DE)

( * ) Notice: Subject to any disclaimer, the term of this patent is extended or adjusted under 35 U.S.C. 154(b) by 1045 days.

(21) Appl. No.: 11/885,827

(22) PCT Filed: Mar. 6, 2006

(86) PCT No.: PCT/EP2006/060494
§ 371 (c)(1),
(2), (4) Date: May 6, 2008

(87) PCT Pub. No.: WO2006/092448
PCT Pub. Date: Sep. 8, 2006

(65) Prior Publication Data
US 2009/0136022 A1    May 28, 2009

(30) Foreign Application Priority Data

Mar. 4, 2005  (EP) ................................. 05090052
Jun. 15, 2005 (DE) ....................... 10 2005 028 662

(51) Int. Cl.
*H04K 1/00* (2006.01)

(52) U.S. Cl.
USPC ............... 380/30; 380/28; 380/44; 708/491; 708/492

(58) Field of Classification Search
USPC ................... 380/30, 28, 44; 708/491, 492
See application file for complete search history.

(56) References Cited

U.S. PATENT DOCUMENTS

| 6,490,352 | B1 * | 12/2002 | Schroeppel ............... 380/30 |
| 6,721,771 | B1 * | 4/2004 | Chang ..................... 708/492 |
| 6,772,184 | B2 * | 8/2004 | Chang ..................... 708/491 |
| 7,069,287 | B2 * | 6/2006 | Paar et al. ................ 708/492 |
| 8,213,606 | B2 * | 7/2012 | Shantz et al. ............. 380/44 |
| 2002/0062330 | A1 * | 5/2002 | Paar et al. ................ 708/492 |
| 2003/0208518 | A1 | 11/2003 | Gura et al. |
| 2004/0078407 | A1 * | 4/2004 | Naslund et al. .......... 708/492 |

(Continued)

OTHER PUBLICATIONS

Paar, C., "A new architecture for a parallel finite field multiplier with low complexity based on composite fields," Jul. 1996.*

(Continued)

*Primary Examiner* — Ashok Patel
*Assistant Examiner* — Gary Gracia
(74) *Attorney, Agent, or Firm* — Ware, Fressola, Maguire & Barber LLP

(57) ABSTRACT

Safeguarding communication channels is required in particular in wireless networks. The use of encryption mechanisms in the form of software is limited by the required calculation and energy capacities of mobile terminals. Costs are of significance when using hardware solutions for cryptographic operations. The present invention provides an approach which simultaneously tackles all those points. It concerns a hardware accelerator for polynomial multiplication in extended Galois fields (GF), wherein the per se known Karatsuba method is iteratively applied in accordance with the invention. When using the invention the area requirement can be reduced for example from 6.2 mm² to 2.1 mm². The solution according to the invention also reduces the energy consumption in comparison with solutions in accordance with the state of the art by 30%.

6 Claims, 5 Drawing Sheets

U.S. PATENT DOCUMENTS

| | | | |
|---|---|---|---|
| 2004/0098440 A1 | 5/2004 | Koc et al. | |
| 2004/0109561 A1* | 6/2004 | Koc et al. | 380/28 |
| 2004/0199560 A1* | 10/2004 | Dupaquis et al. | 708/492 |
| 2004/0267855 A1* | 12/2004 | Shantz et al. | 708/523 |
| 2005/0044124 A1* | 2/2005 | Vanstone | 708/492 |
| 2006/0072743 A1* | 4/2006 | Naslund et al. | 380/28 |

OTHER PUBLICATIONS

Ingo Riedel (riedeli@web.de) Diploma Thesis; *Security in Ad-hoc Networks: Protocols and Elliptic Curve Cryptography on an Embedded Platform*; Mar. 2003, Ruhr-Universitat Bochum, NEC Europe Ltd—Network Laboratories, Heidelberg, Dr. Dirk Westhoff, Dr. Bernd.

S. Shimizu et al., *On-demand design service innovations*; IBM J. Res & Dev. vol. 48, No. 5/6, Sep./Nov. 2004, pp. 751-765.

M. Ernst et. al., A Reconfigurable System on Chip Implementation for Elliptic Curve Cryptography over GF ($2^n$), B.S. Kaliski Jr. et al. (Eds.): *CHES 2002, LNCS 2523*, pp. 381-399, 2003, Springer-Verlag Berlin Heidelberg 2003, pp. 381-399.

A. Karatsuba et al., *Multiplication of Multidigit Numbers on Automata; Soviet Physics-Doklady*, vol. 7, No. 7, Jan. 1963, Presented by Academician A. N. Kolmogorov, Feb. 13, 1962, translated from Doklady Akademii Nauk SSSR, vol. 145, No. 2, pp. 293-294, Jul. 1962; original article submitted Feb. 9, 1962, pp. 595-596.

A. Reyhani-Masoleh, Low Complexity Bit Parallel Architectures for Polynomial Basis Multiplication over GF ($2^m$), *IEEE Transactions on Computers*, vol. 53, No. 8, Aug. 2004, pp. 945-959.

F. Rodriguez-Henriquez, Parallel Multipliers Based on Special Irreducible Pentanomials, *IEEE Transactions on Computers*, vol. 52, No. 12, Dec. 2003, pp. 1535-1542.

A. Satoh et al., *A Scalable Dual-Field Elliptic Curve Cryptographic Processor*, IEEE Transactions on Computers, vol. 52, No. 4, Apr. 2003, pp. 449-460.

B. Sunar, *A Generalized Method for Constructing Subquadratic Complexity GF (2) Multipliers*, IEEE Transactions on Computers, vol. 53, No. 9, Sep. 2004, 1097-1100.

S. Shimizu et al., *On-demand design service innovations*, IBM J. Res. & Dev., vol. 48 No. 5/6 Sep./Nov. 2004, pp. 751-765.

E. Al-Daoud, et al., A New Addition Formula for Elliptic Curves over GF (2), *IEEE Transactions on Computers*, vol. 51, No. 8, Aug. 2002, pp. 972-975.

T. Kerins, *Design for Reuse of Elliptic Curve Cryptosystem Processors for FPGAs*, Dept. of Electrical and Electronic Engineering, University of College Cork, Ireland.

Z. Dyka et al., Area Efficient Hardware Implementation of Elliptic Curve Cryptography by Iteratively Applying Karatsuba's Method, *IHP, Im Technologiepark 25*, 15236 Frankfurt (Oder) Germany (langendoerfer@ihp-microelectronics.com).

N. Nedjah et al., *A Reconfigurable Recursive and Efficient Hardware for Karatsuba-Ofmans' Multiplication Algorithm*, 0-7803-7729-X/03 2003 IEEE, pp. 1076-1082.

F. Rodriguez-Henriquez, et al., A fast parallel implementation of elliptic curve point multiplication over GF(2),*Microprocessors and Microsystems 28 (2004)*, (www.elservier.com/locate/micpro), pp. 329-339.

S. S. Erdem et al., *A Less Recursive Variant of Karatsuba-Ofman Algorithm for Multiplying Operands of Size a Power of Two*, Proceedings of the 16th IEEE Symposium on Computer Arithmetic (ARITH03), 2003 IEEE.

D. V. Bailey, *Efficient Arithmetic in Finite Extensions with Application in Elliptic Curve Cryptography*, XP-001013927, Journal of Cryptol, 2001 International Association for Cryptologic Research.

IEEE Transactions on Computers, vol. 51, No. 11; H. Wu et al.; "Finite Field Multiplier Using Redundant Representation"; pp. 1306-1316, Nov. 2002.

"An Intro to Elliptical Curve Cryptography"; Internet: www.deviceforge.com/articles/AT4234154468.html; Jul. 20, 2004.

"Multiprecision Integer and Rational Arithmetic C/C ++ Library"; Internet: http://indigo.ie/~mscott/; Aug. 2002.

R. Kraemer et al.; "Efficient Implementations of Cryptographic Routines—A Review and Performance Analysis of Various Approaches"; Computer Science Reports; Jun. 2004; pp. 1-11; XP001248873; Brandenburg University of Technology at Cottbus; Cottbus, Germany.

\* cited by examiner

METHOD AND APPARATUS FOR CALCULATING A POLYNOMIAL MULTIPLICATION, IN PARTICULAR FOR ELLIPTIC CURVE CRYPTOGRAPHY

CROSS REFERENCE TO RELATED APPLICATIONS

This application is for entry into the U.S. national phase under §371 for International Application No. PCT/EP2006/060494 having an international filing date of Mar. 6, 2006, and from which priority is claimed under all applicable sections of Title 35 of the United States Code including, but not limited to, Sections 120, 363 and 365(c), and which in turn claims priority under 35 USC §119 to EP Application No. 05090052.1 filed on Mar. 4, 2005, and German Patent Application No. 10 2005 028 662.3 filed on Jun. 15, 2005.

BACKGROUND OF THE INVENTION

1. Technical Field

The invention concerns a method and an apparatus for calculating a polynomial multiplication. It further concerns a method of encrypting data as well as an encryption unit.

2. Discussion of Related Art

Mobile terminals are making inroads into more and more areas in everyday life. Increasingly more sensitive information is exchanged between mobile terminals or between mobile terminals and stationary communication terminal points. Data exchange is normally protected by encryption mechanisms. Because of the limited resources of mobile terminals however comprehensive use of cryptographic methods is not possible. That applies in particular to the cryptography with public keys (referred to as public key cryptography) which is generally used to provide a secure channel between the communication partners and for the production of digital signatures.

So-called asymmetrical encryption methods are used in public key cryptography. In that case a public key is used for the encryption of data, which for that purpose is notified in accordance with its name to third parties. Decryption of the data encrypted with the public key can only be effected with a private key which only the receiver of the message has. Decryption of the encrypted message with the public key in contrast is practically not possible. The practical impossibility of decryption is due to the asymmetry of the encryption method which uses an encryption algorithm requiring only relatively few computation steps, on the basis of the public key. Decryption which involves a mathematical inversion of the encryption algorithm however, with just knowledge of the public key, requires so many computation steps that the time involved in such an attempt at decryption, even using the most modern and comprehensive computation technology, is practically infinitely great.

Known asymmetrical encryption methods are RSA as well as Diffie-Hellmann methods and the digital signature algorithm DSA which is based thereon.

In recent times elliptic curve cryptography or ECC has been developed to an increased extent. The advantage of ECC over the other specified methods is that it is possible to use shorter keys without reducing the security of encryption. In addition ECC operations are faster than those of the RSA method. An introduction to elliptic curve cryptography is published on the Internet on the following page: http://www.deviceforge.com/articles/AT4234154468.html.

Encryption in ECC is based on the calculation of a product of two operands, which is referred to as "kP". In that case P is a point on an elliptic curve or EC and k is a large number. "kP" multiplication is based on point doubling and point addition. All EC point operations are based on addition, subtraction, squaring, multiplication and division in a selected Galois field (GF).

Hardware accelerators for cryptography operations with public keys are ideal ways of reducing the calculation time and energy consumption. Direct implementation of cryptographic operations however leads to a relatively large amount of area being required on a chip. That causes greater difficulty in the use of hardware accelerators from economic points of view. The boundary conditions of the design of hardware accelerators are therefore the computation time required, energy consumption and the area required.

Known methods of polynomial multiplication on a polynomial basis are described hereinafter. In that respect firstly polynomial multiplication generally is examined and then known methods of accelerating polynomial multiplication are discussed.

2.1 Polynomial Multiplication

In a Galois field $GF(2^n)$ addition and subtraction are XOR operations. Therefore and for greater ease of understanding of the formulae the usual representation of polynomials $$A(x) = \sum_{i=0}^{n-1} a_i x^i$$

is here modified to $$A(x) = \bigoplus_{i=0}^{n-1} a_i x^i.$$

In the context of this application the XOR operation is identified as "$\oplus$". The symbol "+" always denotes usual addition.

The product of two polynomials $$A(x) = \bigoplus_{i=0}^{n-1} a_i x^i \text{ and } B(x) = \bigoplus_{i=0}^{n-1} b_i x^i$$

is the polynomial $$C(x) = A(x) \cdot B(x) = \bigoplus_{i=0}^{2n-2} c_i x^i \qquad (1)$$

wherein $$C_i = \bigoplus_{k+l=i} a_k \cdot b_l,$$

that is to say:

$$c_0 = a_0 \cdot b_0$$
$$c_1 = a_1 \cdot b_0 \oplus a_0 \cdot b_1$$
$$\vdots$$

-continued $$c_{n-1} = a_{n-1} \cdot b_0 \oplus a_{n-2} \cdot b_1 \oplus \ldots \oplus a_0 \cdot b_{n-1}$$

$$\vdots$$

$$c_{2n-3} = a_{n-1} \cdot b_{n-2} \oplus a_{n-2} \cdot b_{n-1}$$

$$c_{2n-2} = a_{n-1} \cdot b_{n-1}$$

Direct implementation of formula (1) requires $n^2$ partial multiplications and $(n-1)^2$ XOR operations of partial products in order to calculate the coefficients $c_i$. All operands in formula (1) are only one bit long. When using EC B-233 both polynomials A(x) and B(x) are 233 bits long. That signifies that a total of $233^2$ one-bit partial multiplications and $232^2$ XOR operations are required.

2.2 Karatsuba-Based Methods of Polynomial Multiplication

For polynomial multiplication with the original Karatsuba method both operands have to be fragmented into two parts of equal length. If the length n of the operands is unequal they must be supplemented by a leading "0". If $a_i$ identifies the i-th bit and $a^i$ identifies the i-th segment of the operand A(x), then the operands can be represented as follows:

$$A(x) = a_{n-1} \ldots a_{\frac{n}{2}} a_{\frac{n}{2}-1} \ldots a_1 a_0 \quad (2)$$

$$= a_{n-1} \ldots a_{\frac{n}{2}} \cdot x^{\frac{n}{2}} \oplus a_{\frac{n}{2}-1} \ldots a_1 a_0$$

$$= a^1 \cdot x^{\frac{n}{2}} \oplus a^0$$

The polynomial B(x) can be represented in the same fashion. The Karatsuba formula for the product C(x)=A(x)·B(x) is $$C(x) = a^0 b^0 \oplus [a^0 b^0 \oplus a^1 b^1 \oplus (a^0 \oplus a^1)(b^0 \oplus b^1)] \cdot x^{\frac{n}{2}} \oplus a^1 b^1 \cdot x^n \quad (3)$$

The publication by Bailey, D. V.; Paar, C.: Efficient Arithmetic in Finite Field Extensions with Application in Elliptic Curve Cryptography. Journal of Cryptology, vol. 14, no. 3, 153-176. 2001 proposes a method of applying Karatsuba's idea. Hereinafter that method is referred to as Bailey's method. In that method the operands are divided into three parts. Bailey's method requires six partial multiplications of n/3-bit long operands. That method can be combined with the original Karatsuba formula for such operands, the length of which can be divided by six.

US No 2004/0109561 A1 describes a method of multiplying numbers over a Galois field GF ($2^m$). That method involves the use of a recursive algorithm for breaking a product down into a number of sub-products until the remaining magnitude is sufficient to execute a non-recursive algorithm to complete the multiplication. A disadvantage of the method described in that document is its relatively low area efficiency.

DISCLOSURE OF INVENTION

The technical object of the present invention is that of providing a method and an apparatus for polynomial multiplication which permit area-efficient implementation of elementary mathematical operations.

In accordance with a first aspect there is proposed a method of calculating a polynomial multiplication, comprising the steps:

providing coefficients $a_i$, $b_i$ of two polynomials $$A(x) = \bigoplus_{i=0}^{n-1} a_i x^i$$

and $$B(x) = \bigoplus_{i=0}^{n-1} b_i x^i,$$

wherein "⊕" identifies an addition or an XOR operation and $a_i$, $b_i$ are binary one-bit values, that is to say 0 or 1, and $x^i=1$, selecting either two or more than two fragments, one of each polynomial, as operands for partial multiplication, partially multiplying the selected fragments in order to obtain a partial product, wherein the selection step is effective iteratively in accordance with a predefined selection plan and wherein fragments are used in which the respective multiplier step for forming a partial product of respective fragments requires only one calculation step, and accumulating the partial products, wherein accumulation is controlled in accordance with a predefined accumulation plan for the accumulation of a partial product currently occurring at the output of the partial multiplier with one or more terms of a result polynomial which is further developed iteration step by iteration step.

The iterative application according to the invention of the selection and multiplication steps permits a hardware implementation with a reduced area requirement and energy consumption. That applies in particular in comparison with a hardware implementation of a recursive algorithm as is described in US No 2004/0109561A1. By way of example the chip area which is required for the calculation of the product of two 233 bit-long operands is 2.18 mm² (2 segment structure). Those advances are only paid for with a slightly increased calculation time.

An additional saving in area is achieved by the use according to the invention of a predefined accumulation plan which makes it possible to use a control signal-based accumulation control in a simple switching system instead of complicated data paths between hard-wired components of the polynomial multiplier. Here, taking the example of an iterative Karatsuba multiplier according to the invention for 233 bits the area requirement achieved is only 1.52 mm² (4-segment structure), in which case the number of clock cycles is not increased by the use of the accumulation plan.

In contrast 6.2 mm² is required for standard application of the Karatsuba method. The solution according to the invention also reduces the energy consumption by 30% with respect to known, completely recursive approaches.

The method according to the invention affords its advantages in particular in respect of hardware implementation. It can however also be implemented in the form of software. A software implementation of the method according to the invention has the advantage of better performance in relation to calculation of the polynomial product, in comparison with known polynomial multiplication software solutions.

The method according to the invention also permits increased flexibility in comparison with known methods.

Fragments of polynomials are occasionally also referred to as segments in the description hereinafter, meaning the same item. Instead of fragmentation reference is also made to segmentation.

In a preferred embodiment of the method according to the invention the accumulation step is carried out in parallel with the iterative fragmentation step and includes a partial accumulation step which is carried out in accordance with an iteration of a multiplication step.

In a further preferred embodiment of the method according to the invention the selection, multiplication and accumulation steps are based on a Karatsuba method for carrying out a polynomial multiplication. An example of use of the Karatsuba method is described in greater detail hereinafter in conjunction with the description of FIGS. 1 and 2 with reference to the formulae (3) through (8).

In a further embodiment prior to the selection step the selection plan and the accumulation plan are selected in accordance with a respective length of the polynomials and a predetermined word width of a partial multiplier used for carrying out the partial multiplication step, from a plurality of stored selection and accumulation plans. The length of the sub-polynomials corresponds to the length of the data words which can be applied at the input of the polynomial multiplication and which are to be multiplied by each other in accordance with a polynomial multiplication. This embodiment profits in particular from the flexibility which is predetermined in accordance with the invention so that one and the same hardware can be used for different polynomial lengths.

In accordance with a second aspect of the invention there is provided a method of encrypting data which comprises a step of calculating a product of two polynomials. In accordance with the invention calculation of the product of the polynomials is effected in accordance with the method of the first aspect of the invention or in accordance with one of the described specific embodiments.

Preferably encryption of the data is effected by means of elliptic curve cryptography. In other words: encryption of the data is effected by means of an elliptic curve over a Galois field. In that respect preferably one of the following curves is used: the curve B-163 over the Galois field $GF(2^{163})$ or the curve B-233 over the Galois field $GF(2^{233})$, or the curve B-283 over the Galois field $GF(2^{283})$ or the curve B-409 over the Galois field $GF(2^{409})$, or the curve B-571 over the Galois field $GF(2^{571})$, or the curve K-163 over the Galois field $GF(2^{163})$ or the curve K-233 over the Galois field $GF(2^{233})$, or the curve K-283 over the Galois field $GF(2^{283})$ or the curve K-409 over the Galois field $GF(2^{409})$, or the curve K-571 over the Galois field $GF(2^{571})$.

In accordance with a third aspect of the invention there is provided a polynomial multiplier comprising
a selection unit which is adapted
to receive coefficients $a_i$, $b_i$ of two polynomials $$A(x) = \bigoplus_{i=0}^{n-1} a_i x^i$$

and $$B(x) = \bigoplus_{i=0}^{n-1} b_i x^i,$$

wherein "$\oplus$" identifies an addition or an XOR operation, $a_i$ and $b_i$ are one-bit binary values, that is to say 0 or 1, and $x^i=1$, and
in a working step to select either two or more than two fragments, one from each polynomial, of such a length as operands for a partial multiplication and to provide same at its output, that the partial multiplication requires only one calculation step, wherein the selection unit is additionally adapted to select the fragments iteratively in accordance with a predefined selection plan in successive working steps,
at least one partial multiplier which is connected to the selection unit and which is adapted in an iteration step to carry out partial multiplication of the either two or the more than two operands and to provide the obtained partial product at its output,
an accumulation unit which is connected to the partial multiplier and which is adapted to calculate the complete polynomial product by an accumulation which is completed iteration step by iteration step of the partial products which it has received from the partial multiplier, and
an accumulation control unit which is connected to the partial multiplier and the accumulation unit and which is adapted to output after a respective current iteration step a control signal which instructs the accumulation unit in accordance with a predetermined accumulation plan to accumulate a partial product currently occurring at the output of the partial multiplier with one or more terms of a result polynomial which is further developed iteration step by iteration step.

The polynomial multiplier in accordance with the second aspect of the invention is distinguished by a reduced area requirement and a reduced level of energy consumption with a degree of flexibility which is increased in comparison with the state of the art, in regard to the word length of the data words to be multiplied. The latter is effected by the use of a programmable accumulation plan by the accumulation control unit.

In an embodiment of the polynomial multiplier according to the invention the accumulation unit includes a number of XOR gates, wherein each XOR gate is connected at an input to one or more terms of the arising result polynomial and at another input to the partial multiplier. Preferably in that case the accumulation control unit has a number of control logic gates which corresponds to the number of XOR gates of the accumulation unit. Each control logic gate is associated with a respective XOR gate and the accumulation control unit is adapted to produce a predetermined set of control signals in a respective iteration step and to apply the control signals to the control logic gates, wherein a respective control signal establishes whether a respective XOR gate is or is not activated in a current iteration step for accumulation. That embodiment permits a particularly simple configuration of the accumulation control unit, which saves on surface area. A current accumulation step is controlled for example by a control word which corresponds to the set of control signals. Each control bit of the control word corresponds to a control signal and by way of a respective control logic gate controls the activation of a given XOR gate in the respective accumulation step. In that case the control logic gates are preferably AND gates having two inputs of which a first input receives a logic one and a second input receives a respective control signal.

In a further preferred embodiment of the polynomial multiplier according to the invention the partial multiplier is adapted to carry out a calculation step of partial multiplication in a clock cycle.

Preferably not just accumulation is controlled by a programmable control unit, but also selection of the fragments. An embodiment has a selection control unit which is connected to the selection unit and which is adapted in accordance with the respective current iteration step to output a control signal which instructs the selection unit in accordance with the predetermined selection plan to select a respective fragment of predetermined size from each polynomial. Hardware implementation can be effected in a similar fashion to the situation with the accumulation control unit with control logic gates so that once again only a corresponding set of control signals has to be delivered, which in turn simplifies and shortens data paths and thus increases area efficiency.

The selection control unit and the accumulation control unit are preferably integrated in a single multiplication control unit.

Preferably the accumulation control unit and the selection control unit are adapted in response to the receipt of polynomials at the input of the selection unit to select the selection plan and the accumulation plan in accordance with a respective length of the polynomials and a predetermined word width of the partial multiplier from a plurality of stored selection and accumulation plans. That embodiment makes use of the advantage of the high flexibility of the polynomial multiplier.

In a further preferred embodiment of the polynomial multiplier according to the invention the partial multiplier is adapted to carry out partial multiplication of two operands which are provided at the output of the selection unit by means of a Karatsuba formula for a partial product $C(x)=A(x)\cdot B(x)$, in accordance with the type:

$$C(x) = a^0b^0 \oplus [a^0b^0 \oplus a^1b^1 \oplus (a^0 \oplus a^1)(b^0 \oplus b^1)] \cdot x^{\frac{n}{2}} \oplus a^1b^1 \cdot x^n$$

and to provide the partial product at its output.

A preferred embodiment of the polynomial multiplier is in the form of an integrated circuit.

A fourth aspect of the invention concerns an encryption unit for the encryption of data effecting a polynomial multiplication, comprising a data input for non-encrypted data, a polynomial multiplier connected to the data input, as set forth in the third aspect of the invention or one of its embodiments, and a data output connected to the polynomial multiplier for output of the encrypted data.

A preferred embodiment of the encryption unit is adapted for encryption of the data by means of elliptic curve cryptography, that is to say in particular for encryption of the data at the data input by means of an elliptic curve over a Galois field. One of the curves already described in connection with the method of the second aspect of the invention can be used for that purpose.

The encryption unit can be implemented in the form of an integrated circuit or in the form of an executable computer program.

A further aspect of the invention is therefore formed by a data carrier with an executable program which implements a method of encrypting data as set forth in the second aspect of the invention or one of its embodiments.

BRIEF DESCRIPTION OF THE DRAWINGS

The invention and further preferred embodiments by way of example of the invention are described hereinafter with reference to the drawings in which.

DETAILED DESCRIPTION

The invention will firstly be described by means of a specific embodiment. In this respect attention is directed in parallel to FIGS. 1 and 2.

Figure 1:
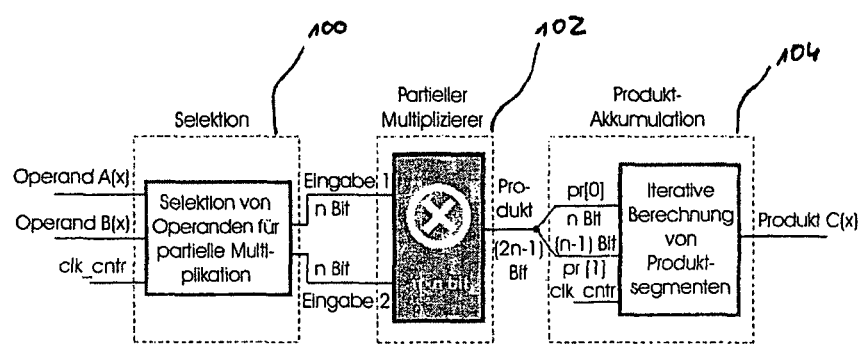
FIG. 1 shows the structure of an embodiment of a polynomial multiplier.
Figure 2:
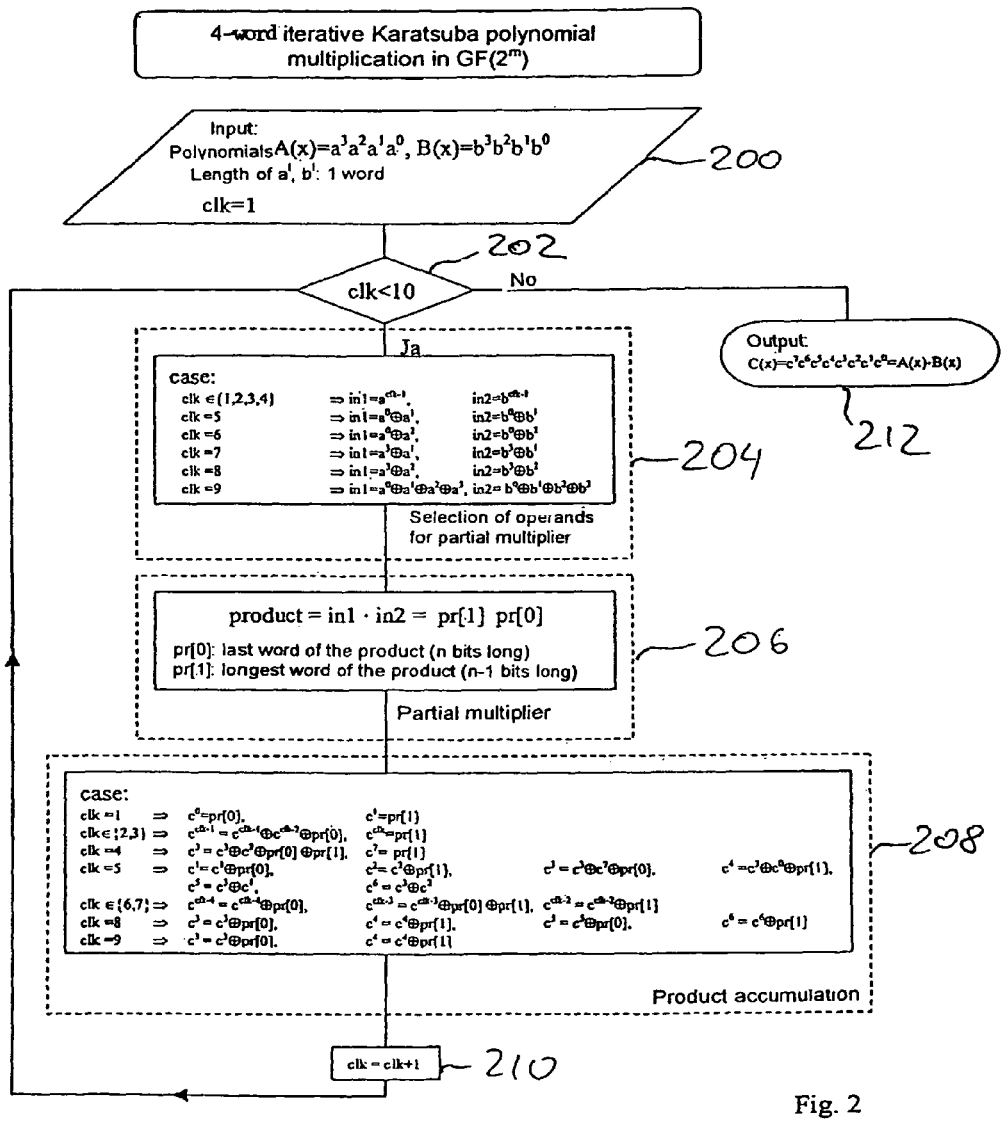
FIG. 2 shows a detailed illustration of an embodiment of a method of polynomial multiplication using the example of a 4-word Karatsuba polynomial multiplication in GF ($2^m$)

FIG. 1 shows the structure of an embodiment of a polynomial multiplier. A flow chart of an embodiment of the method according to the invention in which by way of example a four-word iterative Karatsuba polynomial multiplication in GF($2^m$) is used is illustrated in FIG. 2.

The description hereinafter uses as its example the curve B-233 over a Galois field GF($2^{233}$) which is recommended by the National Institute of Standards and Technology of the United States of America (NIST) and which is particularly suitable for implementation in the form of hardware.

Elliptic curve cryptography or ECC guarantees the same security as the known RSA method, but makes it possible to use markedly shorter keys. In addition ECC operations are faster than those of the RSA method. Although ECC is less computing-intensive than RSA, it requires a relatively large amount of energy and time in order to calculate the product of a 233 bit-long number k and a point P with two 233 bit-long co-ordinates. That operation is referred to as "kP" multiplication. In that case P is a point on an elliptic curve or EC and k is a large number. "kP" multiplication can be calculated by means of the "double and add" method (point doubling and point addition) or with the Montgomery method.

The result of the "kP" multiplication must be reduced independently of the method used. The reduction operation is carried out using what are referred to as irreducible polynomials and can be a very complicated operation in the Galois field GF($2^m$). The irreducible polynomial for B-233 is the trinomial: $f(x)=x^{233} \oplus x^{74} \oplus 1$.

In the Galois field GF($2^m$) addition and subtraction are XOR operations. For that reason and for greater ease of understanding of the formulae the usual representation of polynomials $$A(x) = \sum_{i=0}^{n-1} a_i x^i$$

is here modified to $$A(x) = \bigoplus_{i=0}^{n-1} a_i x^i.$$

In the context of this application the XOR operation is identified as "$\oplus$". The symbol "+" always denotes a conventional addition operation. Division of polynomials is carried out in the normal way in two steps: firstly the inverse of the divisor is identified by means of the irreducible polynomial and then the inverse is multiplied with the dividend.

The advantage of the Montgomery method is that the inverse of the product has to be calculated for the reduction procedure a maximum of twice. In the Montgomery method that is achieved by a larger number of multiplication operations which create less computing complication and expenditure than calculation of the inverses. That applies in particular when using the efficient polynomial multiplier proposed here.

A starting point of the present invention is to iteratively apply the original Karatsuba method. In that respect we refer to the method according to the invention also as an iterative Karatsuba method. The essential advantages of that method are as follows:
- a smaller area requirement in terms of hardware accelerators by virtue of the possibility of serially carrying out partial multiplication operations, and
- a smaller number of XOR operations in comparison with the recursive variant of Karatsuba methods.

The Karatsuba formula for the product $C(x)=A(x)\cdot B(x)$ is:

$$C(x) = a^0b^0 \oplus [a^0b^0 \oplus a^1b^1 \oplus (a^0 \oplus a^1)(b^0 \oplus b^1)] \cdot x^{\frac{n}{2}} \oplus a^1b^1 \cdot x^n \qquad (3)$$

In accordance with the invention the Karatsuba formula is applied iteratively in order to calculate the partial products $a^ib^i$. In that case a total of $s^{log_2 3} \approx s^{1.58}$ partial multiplication operations are required, wherein s is the number of segments. The number of segments (s) into which the operands must be broken down is determined by the length of the input words of the multiplier and can be determined prior to the calculation operation as follows: s=length of the operand/word length of the multiplier.

This method can be used in order to accelerate both software and also hardware implementations. In the software implementations, the Karatsuba method is usually applied until both operands involve the length of a data word.

The principle of iterative application in accordance with the invention of the Karatsuba formula is described hereinafter by means of an example in which the operands are split up into four segments. Firstly the Karatsuba formula is used in order to obtain a formula for a product in which only one segment-long operands are used for the partial multiplication.

At the beginning however there are two operands, each of which is 4n bits long. Each operand can be represented in the form of sum of two 2n bit-long parts and broken thereinto:

$$A(x)=a^3a^2a^1a^0=a^3a^2\cdot x^{2n} \oplus a^1a^0$$

$$B(x)=b^3b^2b^1b^0=b^3b^2\cdot x^{2n} \oplus b^1b_0 \qquad (4)$$

The result of the application of the Karatsuba formula is as follows:

$$C(x)=a^1a^0\cdot b^1b^0 \oplus$$

$$\oplus [a^1a^0\cdot b^1b^0 \oplus a^3a^2\cdot b^3b^2 \oplus a^{13}a^{02}\cdot b^{13}b^{02}]\cdot x^{2n}$$

$$\oplus a^3a^2\cdot b^3b^2\cdot x^{4n} \qquad (5)$$

wherein $$a^{13}a^{02}=a^{13}\cdot x^n \oplus a^{02}=(a^1 \oplus a^3)\cdot x^n \oplus (a^0 \oplus a^2)=(a^1\cdot x^n \oplus a^0) \\ \oplus (a^3\cdot x^n \oplus a^2)=a^1a^2)=a^1a^0 \oplus a^3a^2 \qquad (6)$$

and $$b^{13}b^{02}=b^1b^0 \oplus b^3b^2 \qquad (7)$$

Each element with two segments can be represented as $a^ia^j=a^i\cdot x^n \oplus a^j$. For each partial multiplication from the equations (6) and (7) the result of use of the Karatsuba formula is used again. Calculation is effected by iterative implementation of the steps 204 and 206 (FIG. 2), with consideration of the case distinction ("case") which is determined by the current clock cycle ("clk") and which represents a selection plan related to his embodiment.

The end result is reproduced in formula (8) hereinafter:

$$C(x) = a^3\cdot b^3\cdot x^{6n} \oplus (a^2\cdot b^2 \oplus a^3\cdot b^3 \oplus a^{23}\cdot b^{23})\cdot x^{5n} \oplus \qquad (8)$$

$$(a^1\cdot b^1 \oplus a^2\cdot b^2 \oplus a^3\cdot b^3 \oplus a^{13}\cdot b^{13})\cdot x^{4n} \oplus$$

$$(a^0\cdot b^0 \oplus a^1\cdot b^1 \oplus a^2\cdot b^2 \oplus a^3\cdot b^3 \oplus a^{01}\cdot b^{01} \oplus$$

$$a^{02}\cdot b^{02} \oplus a^{13}\cdot b^{13} \oplus a^{23}\cdot b^{23} \oplus a^{0123}\cdot b^{0123})\cdot x^{3n} \oplus$$

$$(a^0\cdot b^0 \oplus a^1\cdot b^1 \oplus a^2\cdot b^2 \oplus a^{02}\cdot b^{02})\cdot x^{2n} \oplus$$

$$(a^0\cdot b^0 \oplus a^1\cdot b^1 \oplus a^{01}\cdot b^{01})\cdot x^n \oplus a^0\cdot b^0$$

Each of the operands of the right-hand term of formula (8) is one segment long so that the resulting partial product is (2n−1) bits long. The bits from n−1 through 0 of the product $a^i\cdot b^i$ are noted in the form $a^ib^i[0]$ and the bits from 2n−1 through n in the form $a^ib^i[1]$:

$$a^i\cdot b^i=a^ib^i[1]\cdot x^n \oplus a^ib^i[0] \qquad (9)$$

With the notation introduced in equation (9) formula (8) can be represented as in Table 1 hereinafter:

TABLE 1

Accumulation plan corresponding to formula (8)

| Partial products | Result segments | | | | | | | |
|---|---|---|---|---|---|---|---|---|
| $a^0\cdot b^0[0]$ | | | | | | $\oplus$ | $\oplus$ | $\oplus$ | $\oplus$ |
| $a^0\cdot b^0[1]$ | | | | | $\oplus$ | $\oplus$ | $\oplus$ | $\oplus$ | |
| $a^1\cdot b^1[0]$ | | | | | $\oplus$ | $\oplus$ | $\oplus$ | $\oplus$ | |
| $a^1\cdot b^1[1]$ | | | | $\oplus$ | $\oplus$ | $\oplus$ | $\oplus$ | | |
| $a^2\cdot b^2[0]$ | | | | $\oplus$ | $\oplus$ | $\oplus$ | $\oplus$ | | |
| $a^2\cdot b^2[1]$ | | | $\oplus$ | $\oplus$ | $\oplus$ | $\oplus$ | | | |
| $a^3\cdot b^3[0]$ | | | $\oplus$ | $\oplus$ | $\oplus$ | $\oplus$ | | | |
| $a^3\cdot b^3[1]$ | | $\oplus$ | $\oplus$ | $\oplus$ | $\oplus$ | | | | |
| $(a^0\oplus a^1)\cdot(b^0\oplus b^1)[0]$ | | | | | | $\oplus$ | | $\oplus$ | |
| $(a^0\oplus a^1)\cdot(b^0\oplus b^1)[1]$ | | | | | $\oplus$ | | $\oplus$ | | |
| $(a^0\oplus a^2)\cdot(b^0\oplus b^2)[0]$ | | | | | $\oplus$ | | $\oplus$ | | |
| $(a^0\oplus a^2)\cdot(b^0\oplus b^2)[1]$ | | | | $\oplus$ | | $\oplus$ | | | |
| $(a^1\oplus a^3)\cdot(b^1\oplus b^3)[0]$ | | | | $\oplus$ | | $\oplus$ | | | |
| $(a^1\oplus a^3)\cdot(b^1\oplus b^3)[1]$ | | | $\oplus$ | | $\oplus$ | | | | |
| $(a^2\oplus a^3)\cdot(b^2\oplus b^3)[0]$ | | | $\oplus$ | | $\oplus$ | | | | |
| $(a^2\oplus a^3)\cdot(b^2\oplus b^3)[1]$ | | $\oplus$ | | $\oplus$ | | | | | |
| $(a^0\oplus a^1\oplus a^2\oplus a^3)\cdot$ $(b^0\oplus b^1\oplus b^2\oplus b^3)[0]$ | | | | | $\oplus$ | | | | |
| $(a^0\oplus a^1\oplus a^2\oplus a^3)\cdot$ $(b^0\oplus b^1\oplus b^2\oplus b^3)[1]$ | | | | $\oplus$ | | | | | |
| $C(x) =$ | $c^7$ | $c^6$ | $c^5$ | $c^4$ | $c^3$ | $c^2$ | $c^1$ | $c^0$ |

All columns in Table 1 which are listed under the heading "Result segments" represent a given segment $c^i$ which is produced by partial multiplication of the respectively specified selected fragments. Two lines are provided in Table 1 for each partial product, wherein one line represents the lower portion ($a^xb^x[0]$) of the product and the second line represents the upper portion ($a^xb^x[1]$) of the product, as stated above.

The segment $c^i$ can be calculated as XOR interlinking of all lines in Table 1, which contain the symbol "$\oplus$" in the column associated with the segment $c^i$. For example $c^5$ can be calculated as follows:

$$c^5=a^1b^1[1] \oplus a^2b^2[0] \oplus a^2b^2[1] \oplus a^3b^3[0] \oplus a^3b^3[1] \oplus \\ ((a^1\oplus a^3)(b^1\oplus b^3)[1]) \oplus ((a^2\oplus a^3)(b^2\oplus b^3)[0]) \qquad (10)$$

Each segment $c^i$ can be iteratively calculated, that is to say step by step, as in the calculation of the partial products, beginning with $a^0b^0$ through to $(a^0\oplus a^1\oplus a^2\oplus a^3)\cdot(b^0\oplus b^1\oplus b^2\oplus b^3)$. The procedure then begins with calculation of the segments of the products, in which respect the results already present are used (step 208 in FIG. 2). By way of example:

TABLE 2

Example of calculation of product segments using results which are already available

| Step 1 | Step 2 | And so forth through to ... step 9 |
|---|---|---|
| $c^0 = a^0b^0[0]$ | $c^1 = c^1 \oplus a^1b^1[0]$ | |
| $c^1 = a^0b^0[0] \oplus a^0b^0[1]$ | $c^2 = c^2 \oplus a^1b^1[0] \oplus a^1b^1[1]$ | |
| $c^2 = a^0b^0[0] \oplus a^0b^0[1]$ | $c^3 = c^3 \oplus a^1b^1[0] \oplus a^1b^1[1]$ | |
| $c^3 = a^0b^0[0] \oplus a^0b^0[1]$ | $c^4 = c^4 \oplus a^1b^1[0] \oplus a^1b^1[1]$ | |
| $c^4 = a^0b^0[1]$ | $c^5 = a^1b^1[1]$ | |

In parallel with calculation of the segments, each iteration step also involves an accumulation step corresponding to the accumulation plan represented by Table 1. In that way the result C(x) is completed with each iteration step from the first to the last line of the partial products to be calculated.

That iterative calculation of the product C(x) reduces the area requirement of a hardware multiplier. Only a partial multiplier is required for one segment-long operands. After each new clock signal that multiplier supplies the next partial product. The segments of the product C(x) are collected in that way. In the above-specified example accordingly all segments after nine clock cycles contain the correct product of polynomial multiplication.

With the iterative hardware solution described, the chip area required for calculation of the product of two 233 bit-long operands is 2.1 mm². In contrast 6.2 mm² is required for standard application of the Karatsuba method. The solution according to the invention also reduces the energy consumption by 30% in comparison with the original approach. Those advances are only paid for, with an increased calculation time. In an embodiment a polynomial multiplication operation requires three clock cycles while only 1 clock cycle is required in the original Karatsuba method.

The iterative approach according to the invention can be applied in a similar manner to the Bailey method, which is referred to in the context of this application as an iterative Bailey method.

The structure and essential parameters of an embodiment of a hardware implementation of the iterative Karatsuba method are described hereinafter. The structure of an iterative Karatsuba accelerator comprises three essential parts, see FIG. 1:

at each new clock signal a selection unit 100 makes certain parts of both operands available at its output to a downstream-connected partial multiplier, a partial multiplier 102 calculates the partial product of the operands supplied by the selection unit and makes the results available to a product accumulation unit, and the product accumulation unit 104 calculates the end result of the product from the partial products which it receives from the partial multiplier. The theoretical basis and the precise sequence of steps has been described in detail in foregoing paragraphs 4 and 5.

The power data, the chip area and the energy requirement of a polynomial multiplier are substantially influenced by the partial multiplier used. The greater the input signals of the partial multiplier can be, the correspondingly faster is the partial multiplier. On the other hand, that also involves a relatively large amount of area being required. Therefore a decision has to be made between calculation time and chip area, in terms of the hardware design. That however applies only as long as just the partial multiplier is considered. Furthermore, the area of the selection and product accumulation units is also of significance in regard to the polynomial multiplier. The chip area which the product accumulation unit requires depends on the area requirement of the partial multiplier in inversely proportional relationship. In other words, the smaller the partial multiplier, the correspondingly greater is the product accumulation unit. That derives from the fact that more intermediate results have to be stored in the case of small partial multipliers in order to carry out the concluding calculation of the polynomial product. By way of example, the area of the product accumulation unit is 0.649 mm² when the partial multiplier accepts 128 bit-long operands. In contrast the area is 1.466 mm² when the maximum accepted length of the operands is only 32 bits.

In order to obtain a design which is as well adapted as possible for a polynomial multiplier, various partial multipliers were designed. Three one-clock partial multipliers were used for the Karatsuba method according to the invention as well as for an iterative Bailey method according to the invention. Those partial multipliers accept operands of a maximum length of 128, 64 and 32 bits respectively. They were synthesized by means of the applicants' circuitry library and their own 0.25 µm CMOS technology. Table 3 shows the parameter area, time and energy consumption of each of those six partial multipliers. The values were ascertained by means of the design analysis tool from Synopsys.

TABLE 3

Parameters of the partial multipliers produced

| Name of the partial multiplier (PM) | Length of the input values Bits | Area mm² | Time ns | Energy per clock cycle pW.s |
|---|---|---|---|---|
| k128_k64_k32_k16_sh8 | 128 | 1.62 | 12.53 | 1394.4000 |
| k64_k32_k16_sh8 | 64 | 0.51 | 8.99 | 404.3913 |
| k32_k16_sh8 | 32 | 0.16 | 5.62 | 108.2011 |
| p81_p27_sh9 | 81 | 0.90 | 7.98 | 692.0033 |
| p39_sh13 | 39 | 0.26 | 5.97 | 179.4565 |
| p27_sh9 | 27 | 0.13 | 4.80 | 88.4779 |

Embodiments with an accumulation control unit and a selection control unit which are integrated in a multiplication control unit can further enhance flexibility in respect of the required total duration, the possible clock frequencies and the chip area required. Table 4 hereinafter compares parameters of different 233-bit interactive Karatsuba multipliers. It can be seen in that respect that a 1-clock multiplier requires the shortest overall time for a polynomial multiplication, but on the other hand it requires by far the largest chip area.

It will be noted from the data in Table 4 that a 4-segment Karatsuba implementation requires a smaller chip area than an 8-segment implementation. Here it is useful that the logic for selection of the fragments (segments) and for the accumulation of the partial products in embodiments with a higher degree of fragmentation has a considerable influence on the area requirement. It is found that, in the 8-segment implementation, those logic parts require more than 75% of the chip area occupied by the multiplier. Overall the selector and selection logics in the 2-segment multiplier occupy 0.30 mm², in the 4-segment multiplier they occupy 0.78 mm² and in the 8-segment multiplier they occupy 1.18 mm². By virtue of the resulting complicated data path segmentation has a great influence on the chip area required. For that reason in a preferred embodiment the accumulation control unit and the selection control unit are designed with an alternative structure which is described in greater detail hereinafter with reference to FIG. 5.

TABLE 4

Parameters of different 233-bit iterative Karatsuba multipliers

| Multiplier structure | Area [mm²] | Clock cycles | Time [ns] |
|---|---|---|---|
| Recursively | 6.28 | 1 | 19 |
| 2 segments | 2.18 | 3 | 15 |
| 4 segments | 1.52 | 9 | 10 |
| 8 segments | 1.67 | 27 | 9 |

Polynomial multipliers with an implementation of the following methods were produced for a benchmarking test:

Therefore the operands were filled up with preceding zeros, where that was necessary. The result of multiplication is always 465 bits long.

All polynomial multipliers were synthesized using a circuitry library of the applicants' 0.25 μm CMOS technology. The parameters of the implemented polynomial multipliers are set out in Table 4. The data contained therein were obtained by means of different kinds of analysis results from the "Design Analyzer" from Synopsys.

TABLE 5

Parameters of the synthesized polynomial multipliers

| Multiplier name | Area S, mm² | No of clock cycles N | Period T, ns | Power P, mW | Energy E = T · N · P pW · s |
|---|---|---|---|---|---|
| iterative_Karatsuba_2segments (PM - k128_k64_k32_k16_sh8) | 2.18 | 3 | 15 | 98.89 | 4450.1 |
| iterative_Karatsuba_4segments (PM - _k64_k32_k16_sh8) | 1.52 | 9 | 10 | 105.48 | 9493.2 |
| iterative_Karatsuba_8segments (PM - _k32_k16_sh8) | 1.67 | 27 | 9 | 107.63 | 26154.1 |
| iterative_Bailey_3segments (PM - p81_p27_sh9) | 2.12 | 6 | 10 | 148.16 | 8889.6 |
| iterative_Bailey_6segments (PM - p39_sh13) | 1.60 | 18 | 9 | 110.46 | 17894.5 |
| iterative_Bailey_9 segments (PM - p27_sh9) | 1.71 | 36 | 9 | 103.35 | 33485.4 |
| recursive_Karatsuba_for_1clock | 6.28 | 1 | 19.35 | 326.15 | 6311.0 |
| recursive_Bailey_for_1clock | 7.02 | 1 | 16.94 | 441.75 | 7483.3 | iterative Karatsuba method iterative Bailey method recursive Karatsuba method in accordance with the state of the art recursive Bailey method in accordance with the state of the art Three polynomial multipliers with different partial multipliers were used for the first two method implementations (see Table 4) in order to be able to establish the influence of the respective partial multiplier on the power parameters. Those multipliers were named in such a way that the name refers to the method used. By way of example the name iterative_Karatsuba_8segments signifies: iterative Karatsuba method in which incoming operands are fragmented into eight segments.

In the two recursive multipliers the original Karatsuba and Bailey formula respectively is used down to one-bit operands. Both multipliers supply the polynomial product after a clock cycle. They differ in the length of the input operands. The Karatsuba multiplier always expects two 256 bit-long input values while the Bailey multiplier expects two 243 bit-long input values.

Because of the intended use of those multipliers for EC B-233 the input values to be expected are only 233 bits long.

The results reproduced in Table 5 clearly show that an iterative application of the Karatsuba and Bailey methods significantly reduces the chip area required. If the number of iterations is kept low, the approach according to the invention also helps in a reduction in energy consumption. With these design variants, a lesser area requirement and a lower energy consumption is achieved, at the cost of a slower execution time. With an increase in the number of iterations the chip area required is reduced, but the power consumption and computing time required is also increased. Those implementations are of use only when costs form the decisive parameter.

The iterative application of the Karatsuba method for polynomial multiplications therefore permits a reduction in the chip area required and the energy required for carrying out elliptic curve cryptography on mobile terminals. Various methods for polynomial multiplication in $GF(2^n)$ were analyzed and various polynomial multiplication algorithms implemented. Various partial multipliers were produced. They were used for implementing a number of iterative polynomial multipliers in order to ascertain the best possible variant for use in mobile terminals. Our results clearly show that the iterative approach according to the invention leads to significantly better results in terms of chip area and energy consumption than the original direct applications.

Figure 3:
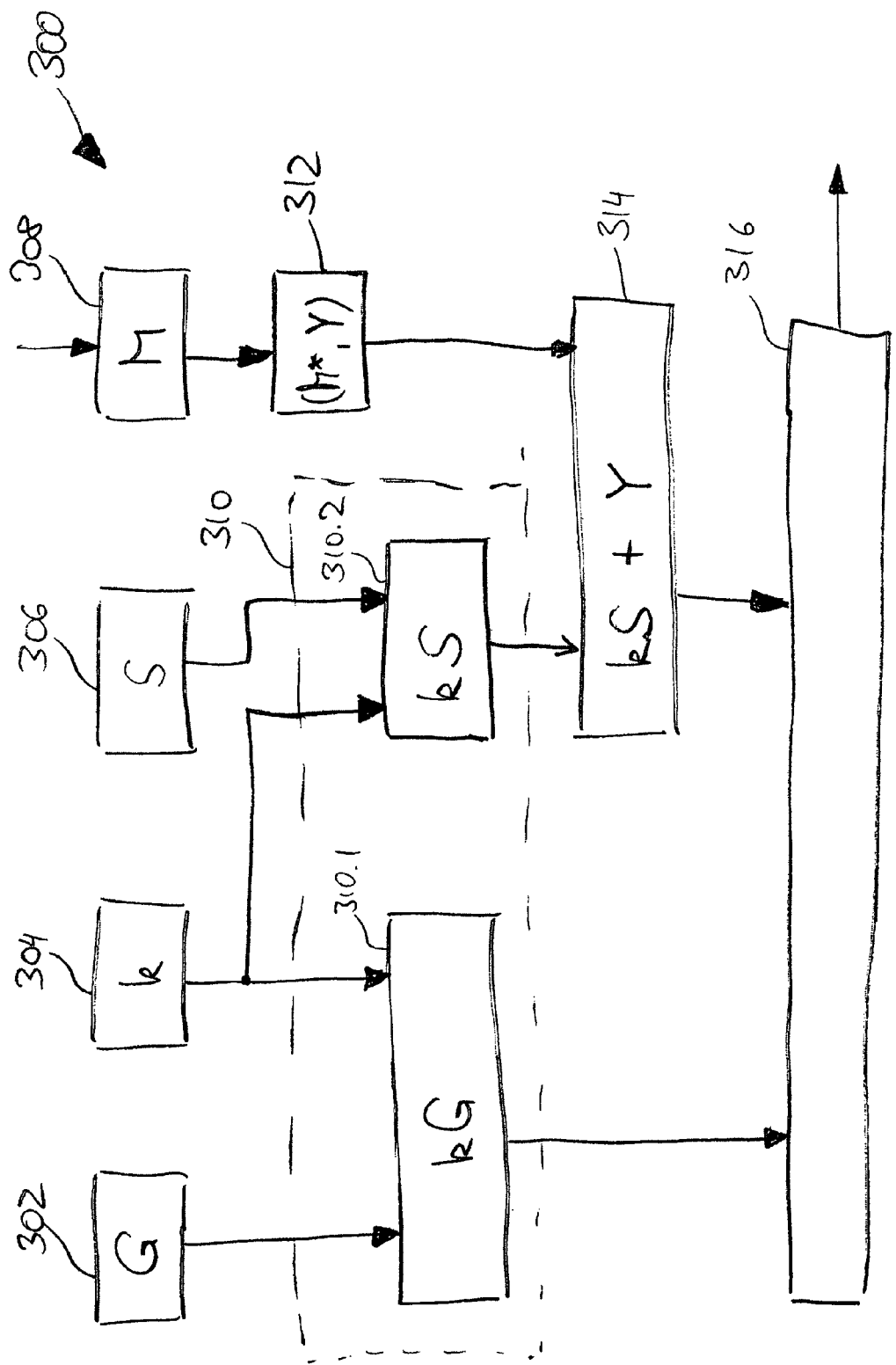
FIG. 3 shows a block diagram oriented on the data flow of an embodiment of a data encryption method.

FIG. 3 shows a block diagram oriented to the data flow of an embodiment of an apparatus for data encryption, which is referred to hereinafter as the encryption unit 300. The encryption unit 300 includes a read only memory 302 in which the co-ordinates of a base point G of a predetermined elliptic curve are stored. A random number generator 304 respectively produces a random number k per portion M of useful data to be encrypted. A memory 306 contains a public key S of the recipient of the message. A data segmenter 308 breaks down incoming useful data to be encrypted into useful data portions M of a predetermined length.

In the framework of encryption of a useful data portion M on the one hand the product kG of the base point G with the currently prevailing random number k is calculated in a Galois field multiplier 310 which includes an iterative polynomial multiplier in accordance with the invention. That is symbolized by a block 310.1.

In addition, in the Galois field multiplier 310 the product kS of the same current random number k and the public key S is determined, which is symbolized by the block 310.2. It is noted that it is admittedly conceivable to provide two independent Galois field multipliers for calculating the products kG and kS. Preferably however there is only one Galois field multiplier in order not to unnecessarily increase the area required. The time delay that this involves is tolerable for most encryption applications.

The useful data portion supplied by the data segmenter 308 is checked for identity with the X-co-ordinate of a point on the elliptic curve, in a transformation unit 312. In that case bits of the useful data portion M which are not fixed are possibly altered so that the result is a modified useful data portion M*. The non-fixed bits can be freely changed without the risk of modifying the useful information. That modification therefore has no influence on the useful information contained in the useful data portion M*. After each production of a modified useful data portion M*, a check is again made to ascertain whether that altered useful data portion is identical to the X-co-ordinate of a point on the elliptic curve.

The mode of operation of the transformation unit 312 is described in greater detail hereinafter by means of an example. A useful data portion includes for example the text "zojka" which is symbolized by the data symbol sequence (5A, 6F, 6A, 6B, 61, 00). In that case the last data symbol "00" is not fixed and can be altered in order to assimilate the sequence of the data symbols to the X-co-ordinate of a point on the elliptic curve. Assuming that in a first step the non-fixed data symbol is defined as "01", the transformation unit 312 will establish that the sequence of data symbols afforded thereby does not have a correspondence in a point on the elliptic curve. If however the non-fixed data symbol is defined as "02" the transformation unit 312 will establish that the sequence of data symbols afforded thereby corresponds to a point on the elliptic curve, which has the following Y-co-ordinate:

7D3C7D654AAB7068E1DA366C49588A27F252D410.

The transformation unit 312 passes from the ascertained point on the elliptic curve X- and Y-co-ordinates to an input of an adder 314, the other input of which receives the product kS of the public key with the currently prevailing random number k. The adder 314 passes the sum kS+Y to an output unit 316 to which the product kG is passed at a further input. The output unit 316 brings the data symbols kG and the sum kS+Y together to afford a data sequence and outputs same. The output can be either serial or parallel.

The encryption unit 300 can be implemented both in the form of hardware and also in the form of software.

Figure 4:
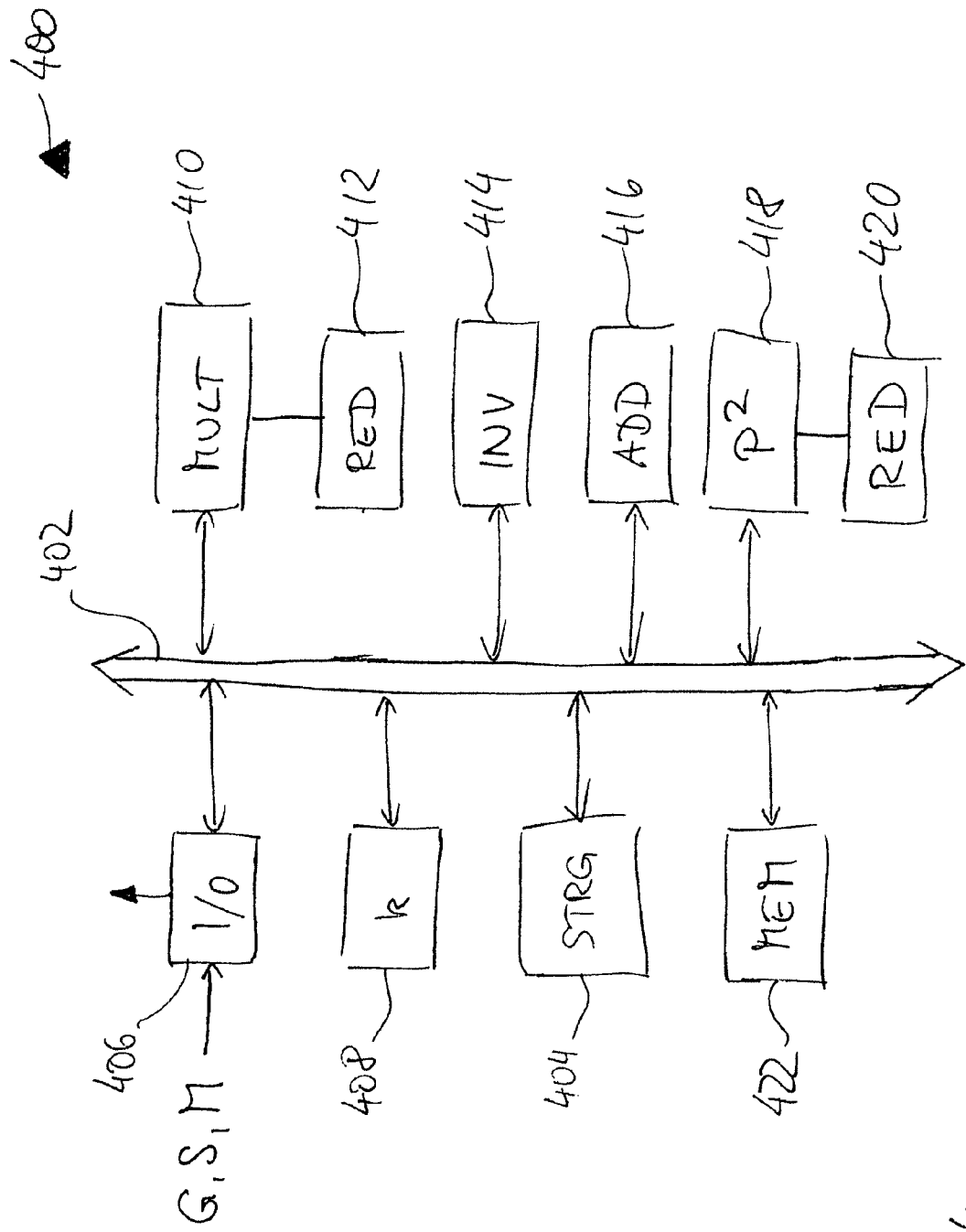
FIG. 4 shows a block diagram of an embodiment of an encryption unit.

FIG. 4 shows a block diagram of a further embodiment of an encryption unit which is referred to hereinafter as the encryption unit 400. The view in FIG. 4 illustrates a hardware implementation.

The individual units of the encryption unit are connected by way of a central bus 402. Connected to the bus 402 is a control unit 404 which includes a control logic for carrying out the Montgomery method. The control unit 404 controls the co-operation of the units described hereinafter. By way of an input/output unit 406 a base point G, a public key S and a useful data portion M can be fed to the encryption unit 400. The input/output unit 406 is adapted at the same time to assemble and output an encrypted message generated by the encryption unit 400, as described in relation to the output unit 316 in FIG. 3.

For each incoming useful data portion M, a random number generator 408 provides a random number k. A Karatsuba polynomial multiplier 410 is connected to a polynomial reduction unit 412. An inversion unit 414 also connected to the data bus 402 is adapted to form the multiplicative inverse of a polynomial. The arrangement further has an adder 416 as well as a polynomial squaring unit 418 which is connected to a further polynomial reducer 420.

The mode of operation of the encryption unit 400 corresponds to that shown with reference to FIG. 3, wherein the control unit 404 performs the function of the transformation unit 312.

Various variants of the encryption unit 400 are possible. By way of example it can be provided that the base point G and/or the public key S are not passed by way of the input/output unit 406 but are fixedly stored in a memory. The memory 422 which is also used in the context of polynomial multiplication can be used for that purpose.

On the other hand it is also possible for not only the base point G, the public key S and the useful data M but also the currently prevailing random number k to be supplied from the exterior and for the random generator 408 not to be integrated into the encryption unit 400. The area requirement of the encryption unit 400 in a hardware implementation can be further reduced in that way.

As already mentioned hereinbefore the addition carried out by the adder 416 is based on the XOR operation.

The software variant was compared to the polynomial multiplier of the "Miracle Library", version 4.7, Shamus Software Ltd. (Ireland), which uses a recursive Karatsuba approach, and with an implementation of the multiplication alternative proposed by Lopez. Microsoft Visual C++ 6.0 was used for implementation of the software variant. The comparative measurements were performed on a PC (Intel Pentium III processor, 800 MHz, Microsoft Windows XP Professional Version 2002, 256 MB RAM) and on a PDA (Pocket PC iPAQ Hewlett-Packard Company, 48 MB ROM; 128 MB RAM, 400 MHz Intel XScale processor model h5500, OS: Pocket PC 2003 Prem with Outlook 2002). For the comparison, firstly a number of 1 million operands each 233 bits long was stored in a data file. Those operands were used for all measurements in order to ensure comparability of the results. Entry number n of the data file was multiplied by entry number n+1 until all operands were used. The test therefore consisted of carrying out 1 million multiplication operations.

Comparison of the average calculation times on the PC revealed an increase in power in comparison with the recursive application of the Karatsuba application by:

up to 17% when using compiler optimizations, and up to 37% without using the compiler optimizations.

On the PDA, the following power increases were found in comparison with the recursive Karatsuba method:

up to 11% when using compiler optimizations, and
up to 17% without using the compiler optimizations.

These values show that the method according to the invention has advantages over known methods not only in a hardware implementation but also in a software implementation.

Figure 5:
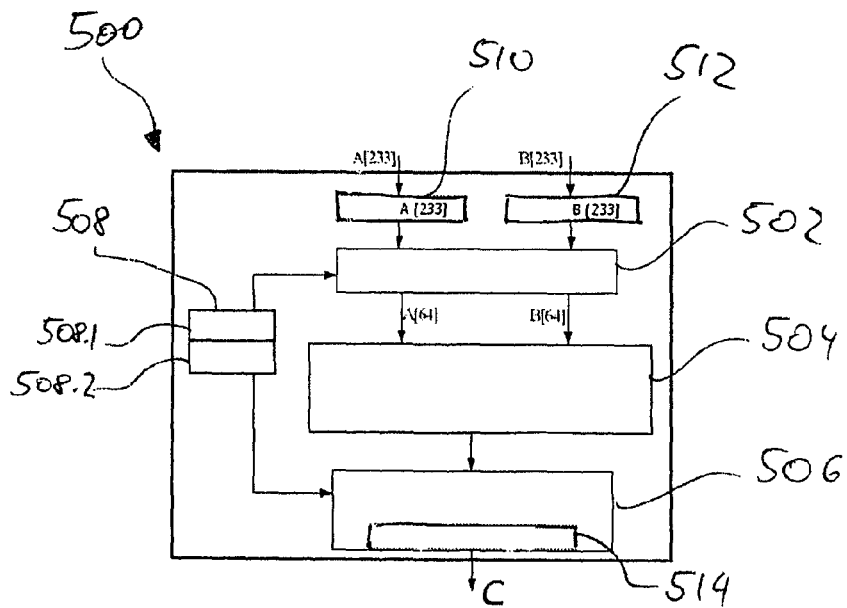
FIG. 5 shows a block diagram of a further embodiment of a polynomial multiplier according to the invention.

FIG. 5 shows a block diagram of an embodiment of a polynomial multiplier 500 according to the invention.

The structure of the polynomial multiplier 500 is the same in many parts as the structure of the polynomial multiplier described with reference to FIG. 1. Thus the polynomial multiplier 500 also includes a selection unit 502, a partial multiplier 504 and a product accumulation unit 506.

While however in the embodiment of FIG. 1 operation of the selection and accumulation units is predetermined by hard-wired data paths and runs clock signal by clock signal a hard-wired selection plan and a hard-wired accumulation plan, the present embodiment has a separate multiplier control unit 508 which integrates thereinto a selection control unit 508.1 and an accumulation control unit 508.2. The multiplier control unit is accordingly connected on the one hand to the selection unit 502 and on the other hand to the accumulation unit 506.

The Figure also shows input registers 510 and 512 which are connected upstream of the selection unit 502 and which are adapted to received incoming data words A and B, the product of which is to be calculated by the polynomial multiplier. The calculated product C will occur at the output of an output register 514 which is here shown as part of the accumulation unit 506.

In a preferred embodiment the accumulation unit 506 at the same time integrates a reduction unit so that a product C reduced to the word length of the incoming data words can be outputted.

It is however alternatively also possible for the reduction unit to be connected downstream of the polynomial multiplier 500. In that case the output register 514 must provide a correspondingly greater word width.

The mode of operation of the polynomial multiplier 500 of FIG. 5, which is modified in comparison with the embodiment of FIG. 1, is described in greater detail hereinafter with reference also to FIG. 6.

Figure 6:
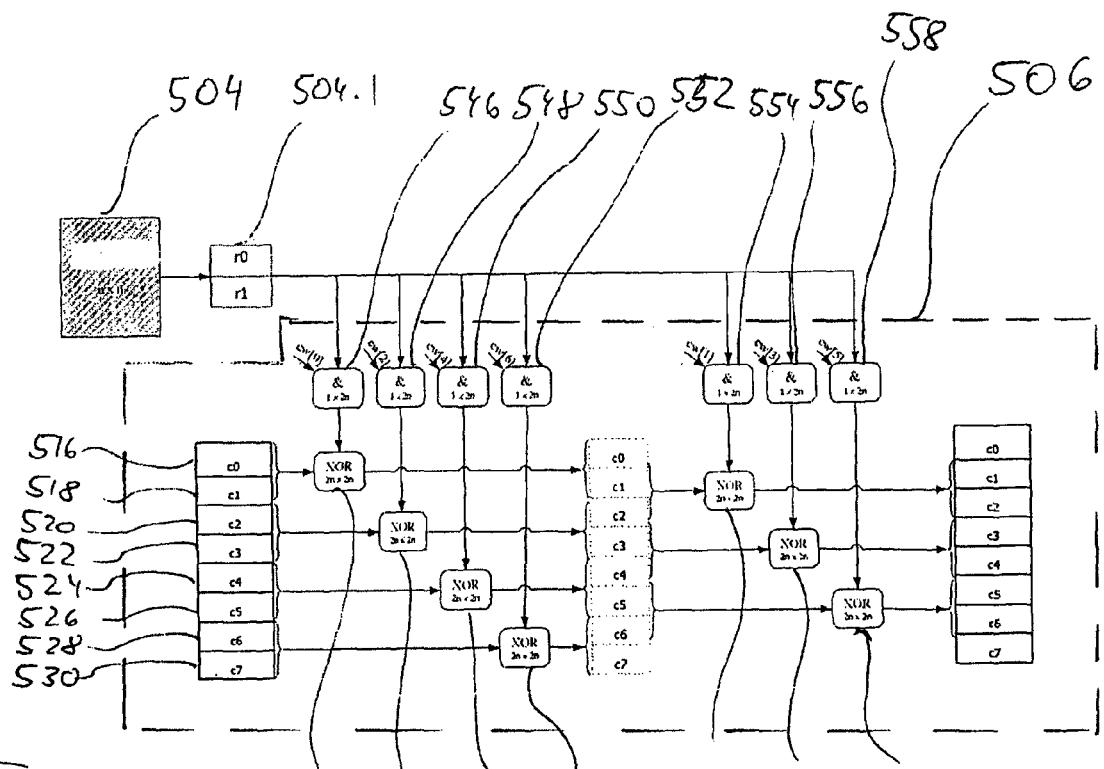
FIG. 6 shows a diagrammatic view of the partial multiplier and the accumulator unit of FIG. 5 in closer detail.

FIG. 6 shows a diagrammatic view of the partial multiplier and the accumulation unit of FIG. 5, with fuller details. The illustration is diagrammatic insofar as it provides a multiple view of some structural elements to clearly show the operating procedure involved in accumulation in an iteration step, as is described in greater detail hereinafter.

The structure of the accumulation unit is described by means of an example of an iterative Karatsuba multiplier with a 4-segment multiplication of 233 bit-long data words, as is also predetermined by way of example in FIG. 5. In this case, 8 product segments c0 through c7 are available at the end of each iteration in the accumulation unit 8, as was described by means of a corresponding example in Table 1. Those segments c0 through c7 are in corresponding registers 516 through 530.

The structure of the registers 516 through 530 is shown a total of three times in FIG. 6 in order to clearly illustrate the procedure involved in an iteration step. In that respect the register structure shown at the left-hand side in the Figure represents an initial register state, the register structure shown in broken line at the center represents a temporary intermediate state which is not stored and the register structure shown at the right-hand side represents an end state of a respective iteration step. As mentioned however all three representations concern the same register structure 516 through 530 in the actual accumulation unit 506.

The data width of the register structure in the case of an nxn-partial multiplier 504 is 8n.

The transition from the initial register state to the concluding register state during an iteration step is afforded by a number of XOR interlinkings which are effected with a total of 7 XOR gates 532 through 544. Each XOR gate links 2n bits from two adjacent registers to the current result of a partial multiplication, which is ready in a register 504.1 at the output of the partial multiplier 504.

Each XOR gate is connected at the input side to a control logic gate. The state of a respective control logic gate decides whether an XOR linkage of the respective register to the current partial product from the register 504.1 is actually effected. In the present embodiment the control logic gates are AND gates 546 through 558, the one input of which receives the result of the partial multiplication and the other input of which receives a respective control bit cw[0], cw[1], ..., cw[6] of a control word (cw). Therefore depending on the value of the respective control bit in the current iteration cycle, the partial multiplication result is allowed or blocked for accumulation at a respective register 516 through 530 by the respective AND gate. If the control bit is set, an addition or XOR interlinking takes place, while if the control bit is not set, no XOR interlinking takes place at the respective XOR gate. An accumulation plan can be implemented in that way in accordance with Table 1 by controlling the interlinkings in each accumulation cycle, that is to say in each iteration step.

That form of controlling accumulation by means of a control word saves on complicated data paths and leads to a considerable saving in area. A further advantage of this embodiment is that different accumulation plans can be implemented in that way. They can be ready in a memory or can be subsequently stored in the accumulation control unit 508.2.

Selection control can be implemented in the same manner and is not described in greater detail here.

The area advantage achieved with the present embodiment is correspondingly greater, the higher the level of segmentation of the data words provided for multiplication. While in the embodiment of FIG. 1 the data path becomes more complicated with increasing segmentation and therefore requires an increase in chip area (from 0.30 mm² for a 2-segment method by way of 0.78 mm² for a 4-segment method up to 1.18 mm² for an 8-segment method), the area requirement of the multiplier control unit 508 which includes both the selection control unit 508.1 and also the accumulation control unit 508.2 is almost constant and ranges in the region of 0.30 mm².

What is claimed is:
1. A polynomial multiplier comprising
at least one partial multiplier
a selection unit which is adapted
to receive coefficients $a_i$, $b_i$ of two polynomials

$$A(x) = \bigoplus_{i=0}^{n-1} a_i x^i$$

and $$B(x) = \bigoplus_{i=0}^{n-1} b_i x^i,$$

wherein "⊕" identifies an addition or an XOR operation, $a_i$ and $b_i$ are one-bit binary values, that is to say 0 or 1, and $x^i=1$, and in a working step to select either two or more than two fragments, one from each polynomial, of such a length as operands for a partial multiplication and to provide same at its output, that the partial multiplication to be made by the partial multiplier requires only one calculation step, wherein the selection unit is additionally adapted to select the fragments iteratively in accordance with a predefined selection plan in successive working steps, wherein the at least one partial multiplier is connected to the selection unit and is adapted in an iteration step to carry out partial multiplication of the either two or the more than two operands and to provide the obtained partial product at its output, an accumulation unit which is connected to the partial multiplier and which is adapted to calculate the complete polynomial product by an accumulation which is completed iteration step by iteration step of the partial products which it has received from the partial multiplier, and characterized in that, the polynomial multiplier is in the form of an integrated circuit, which further comprises an accumulation control unit which is connected to the partial multiplier and the accumulation unit and which is adapted to output after a respective current iteration step a control signal which instructs the accumulation unit in accordance with a predetermined accumulation plan to accumulate a partial product currently occurring at the output of the partial multiplier with one or more terms of a result polynomial which is further developed iteration step by iteration step, wherein the accumulation unit includes a number of XOR gates, each XOR gate is connected at an input to one or more terms of the arising result polynomial and at another input to the partial multiplier and the accumulation control unit has a number of control logic gates which corresponds to the number of XOR gates of the accumulation unit, wherein each control logic gate is associated with a respective XOR gate and in which the accumulation control unit is adapted to produce a predetermined set of control signals in a respective iteration step and to apply the control signals to the control logic gates, wherein a respective control signal establishes whether a respective XOR gate is or is not activated in a current iteration step for accumulation, wherein the control logic gates are AND gates having two inputs of which a first input receives a logic one and a second input receives a control signal and wherein the polynomial multiplier comprises a selection control unit which is connected to the selection unit and which is adapted in accordance with the respective current iteration step to output a control signal which instructs the selection unit in accordance with the predetermined selection plan to select a respective fragment of predetermined size from each polynomial.

2. A polynomial multiplier as set forth in claim 1 which is adapted to carry out partial multiplication of two operands which are provided at the output of the selection unit by means of a Karatsuba formula for a partial product $C(x)=A(x)\cdot B(x)$, in accordance with the type:

$$C(x) = a^0 b^0 \oplus [a^0 b^0 \oplus a^1 b^1 \oplus (a^0 \oplus a^1)(b^0 \oplus b^1)] \cdot x^{\frac{n}{2}} \oplus a^1 b^1 \cdot x^n$$

and to provide the partial product at its output.

3. A polynomial multiplier as set forth in claim 1 wherein the accumulation control unit and the selection control unit are adapted in response to the receipt of polynomials at the input of the selection unit to select the selection plan and the accumulation plan in accordance with a respective length of the polynomials and a predetermined word width of the partial multiplier from a plurality of stored selection and accumulation plans.

4. A polynomial multiplier as set forth in claim 1 wherein the accumulation control unit and the selection control unit form an integrated multiplier control unit.

5. An encryption unit for the encryption of data effecting a polynomial multiplication, comprising a data input for non-encrypted data, a polynomial multiplier connected to the data input, as set forth in claim 1, and a data output connected to the polynomial multiplier for output of the encrypted data.

6. An encryption unit as set forth in claim 5 which is adapted for encryption of the data by means of elliptic curve cryptography.

* * * * *

UNITED STATES PATENT AND TRADEMARK OFFICE
CERTIFICATE OF CORRECTION

| | |
|---|---|
| PATENT NO. | : 8,477,935 B2 |
| APPLICATION NO. | : 11/885827 |
| DATED | : July 2, 2013 |
| INVENTOR(S) | : Peter Langendoerfer et al. |

It is certified that error appears in the above-identified patent and that said Letters Patent is hereby corrected as shown below:

In the Claims:

At column 20, line 15, claim 2, line 1, please insert --,-- after the phrase "claim 1".

At column 20, line 25, claim 3, line 1, please insert --,-- after the phrase "claim 1".

At column 20, line 33, claim 4, line 1, please insert --,-- after the phrase "claim 1".

At column 20, line 41, claim 6, line 1, please insert --,-- after the phrase "claim 5".

Signed and Sealed this
Seventeenth Day of September, 2013

Teresa Stanek Rea
*Deputy Director of the United States Patent and Trademark Office*